(12) United States Patent
Roeber

(10) Patent No.: US 8,690,181 B1
(45) Date of Patent: Apr. 8, 2014

(54) TOW BAR HAVING COMPACT SWIVEL UNIT WITH PIN-LESS STOWING LOBES

(75) Inventor: Leslie Roeber, Emerson, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 179 days.

(21) Appl. No.: 13/385,046

(22) Filed: Jan. 30, 2012

(51) Int. Cl.
*B60D 1/155* (2006.01)
*B60D 1/167* (2006.01)

(52) U.S. Cl.
USPC ............... 280/494; 280/456.1; 280/491.1; 280/492; 280/493

(58) Field of Classification Search
CPC .......... B60D 1/00; B60D 1/155; B60D 1/167; B60D 2001/548
USPC ........ 280/408, 456.1, 458, 460.1, 474, 478.1, 280/482, 491.1, 491.2, 491.3, 491.4, 491.5, 280/492, 493, 494
See application file for complete search history.

(56) References Cited

U.S. PATENT DOCUMENTS

| 2,444,086 | A | 6/1948 | Baker, Jr. |
| 2,746,771 | A | 5/1956 | Gross |
| 4,200,306 | A | 4/1980 | Helms |
| 4,711,461 | A | 12/1987 | Fromberg |
| 5,186,483 | A | 2/1993 | Sheppard |
| 5,516,140 | A | 5/1996 | Hinte |
| 5,531,283 | A | 7/1996 | Austin et al. |
| RE35,482 | E | 3/1997 | Johnson |
| 5,765,851 | A | 6/1998 | Parent |
| 5,957,477 | A | 9/1999 | Ensz et al. |
| 6,203,049 | B1 | 3/2001 | Gibson |
| 6,764,092 | B1 | 7/2004 | Greaves, Jr. |
| 6,877,758 | B2 | 4/2005 | Colistro |
| 7,004,490 | B2 * | 2/2006 | Klar ............................ 280/491.3 |
| 7,125,031 | B1 | 10/2006 | Schoonover |
| 7,445,226 | B1 | 11/2008 | Hahne et al. |
| 7,837,216 | B1 * | 11/2010 | Greaves et al. ............ 280/491.4 |
| 7,959,180 | B1 | 6/2011 | Huston et al. |
| 8,128,116 | B1 * | 3/2012 | Huston et al. .................. 280/493 |
| 8,439,388 | B1 * | 5/2013 | Westervelt ..................... 280/494 |
| 8,505,952 | B1 * | 8/2013 | Choquette ................... 280/491.2 |
| 8,567,807 | B2 * | 10/2013 | Su ................................ 280/491.3 |
| 8,573,629 | B1 * | 11/2013 | Kraai et al. ................. 280/491.4 |
| 2003/0094786 | A1 * | 5/2003 | Greaves, Jr. ................... 280/493 |
| 2006/0249926 | A1 * | 11/2006 | Smith ......................... 280/491.1 |
| 2007/0194557 | A1 | 8/2007 | Caporali et al. |
| 2010/0225092 | A1 | 9/2010 | Hudson |
| 2012/0248737 | A1 * | 10/2012 | Fincher et al. ............. 280/491.4 |

* cited by examiner

*Primary Examiner* — Joseph M Rocca
*Assistant Examiner* — Marc A Scharich
(74) *Attorney, Agent, or Firm* — Donald R. Schoonover

(57) ABSTRACT

A tow bar including a towing vehicle hitch; a towed vehicle hitch; a towing connector releasably connectable to the towing vehicle hitch; a swivel unit having a first portion fixedly secured to the towing connector, a second portion connected to the first portion to pivot about a transverse horizontal axis, a third portion connected to the second portion to pivot about a fore-to-aft horizontal axis; a pair of opposing tow bar legs connected to the third portion to pivot about a vertical axis; and rear leg connectors to releasably connect the aft ends of the tow bar legs to the towed vehicle hitch; wherein the first portion includes an upwardly-extending lobe enabling the tow bar legs to be pin-lessly stowed in a horizontal orientation at the rear of the towing vehicle; and a swivel device for such a tow bar.

16 Claims, 3 Drawing Sheets

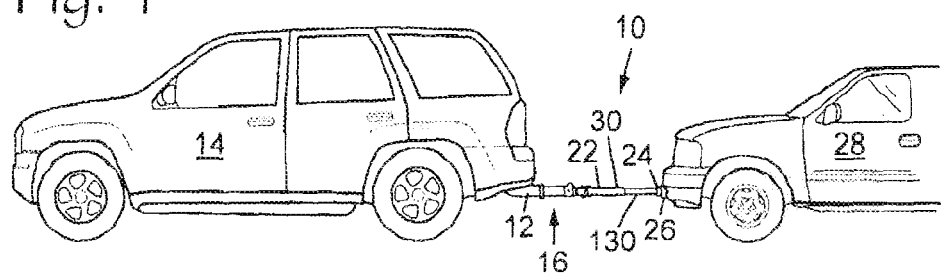
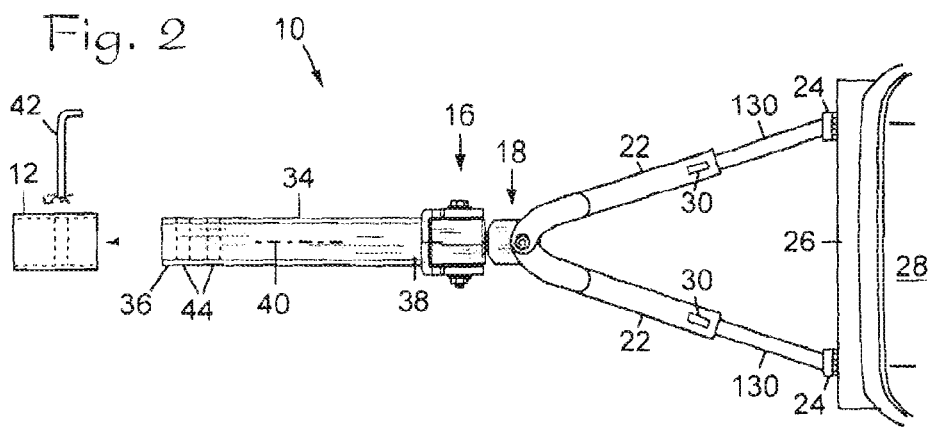
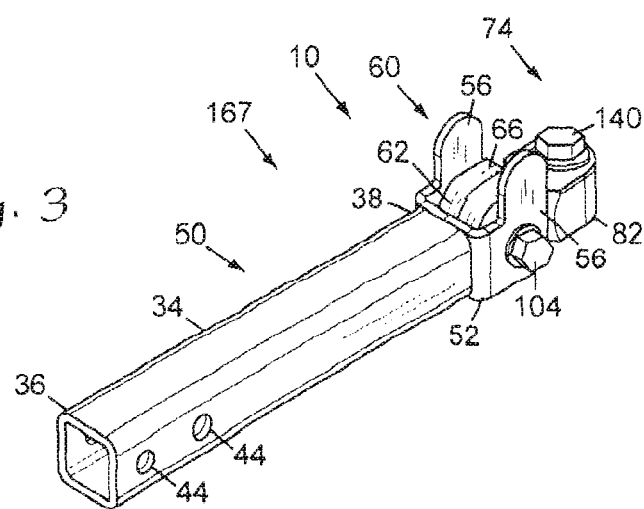

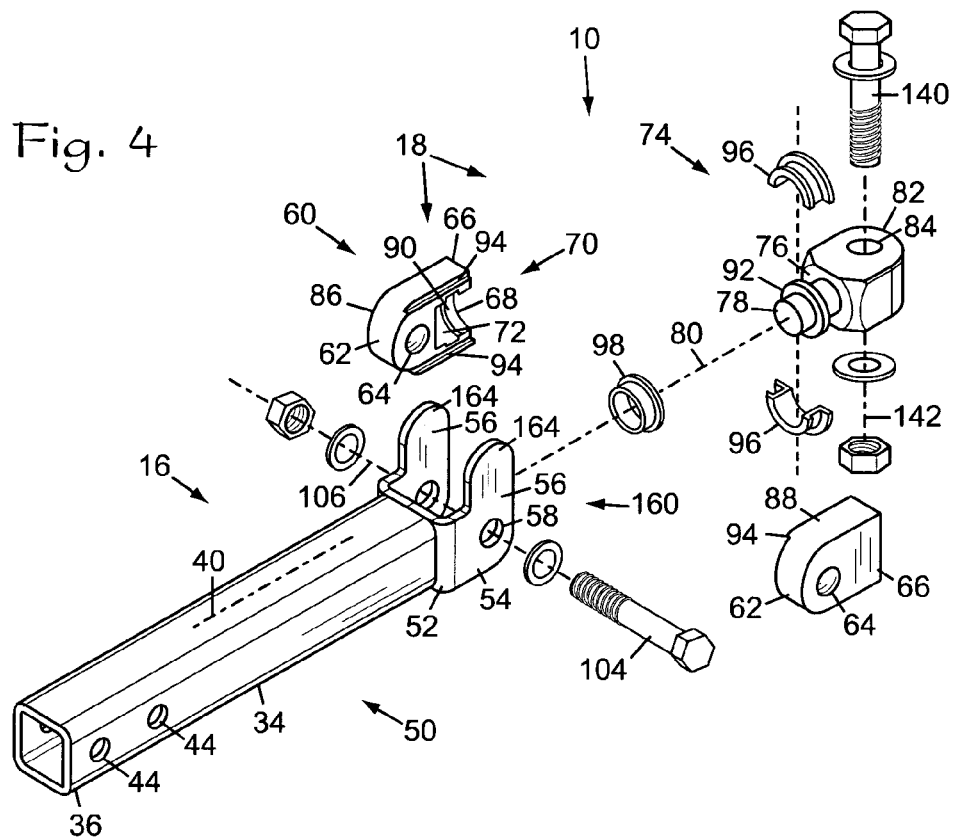
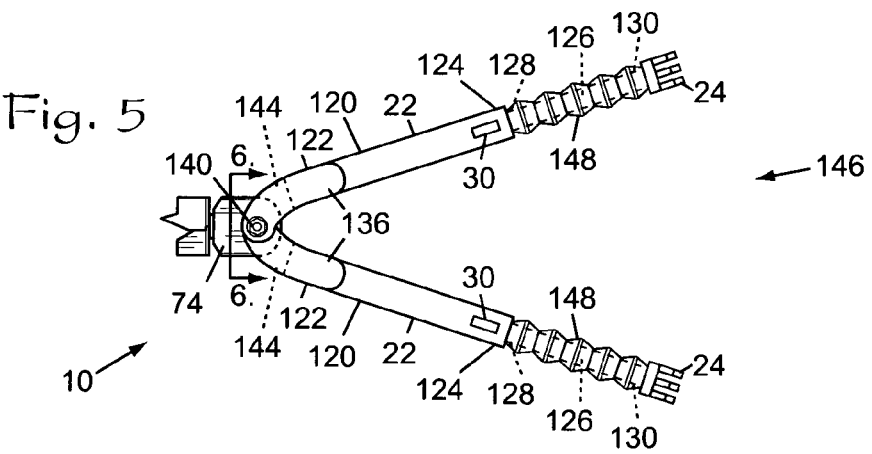

TOW BAR HAVING COMPACT SWIVEL UNIT WITH PIN-LESS STOWING LOBES

CROSS-REFERENCE TO RELATED APPLICATION

This application was filed concurrently with application Ser. No. 29/395,496, now U.S. Pat. No. D693,746, which is incorporated herein by reference.

BACKGROUND OF THE INVENTION

1. Field of the Invention

The present invention relates to towing accessories and, more particularly without limitation, to tow bars for towing a vehicle to be towed behind a towing vehicle.

2. Description of the Related Art

A tow bar is generally used for connecting a towing hitch apparatus of a vehicle to be towed, sometimes referred to herein as a towed vehicle, to a towing hitch apparatus of a towing vehicle. For applications wherein the towed vehicle will be towed at a speed sufficient to move with the flow of traffic on a public roadway, the tow bar, which connects the front end of the towed vehicle to the rear end of the towing vehicle, generally has two tow bar legs with the front ends of the tow bar legs forming the apex of an isosceles triangle and the rear ends of the tow bar legs spaced apart and forming the sides of the triangle. The triangular configuration causes the towed vehicle to closely track the towing vehicle, both along straightaways and around turns.

Tow bars for moving towed vehicles rapidly along public roadways must be designed to accommodate variations in attitude that operatively arise between the towing and towed vehicles, which variations are constantly and continuously changing. One such variation in attitude between the vehicles is the instantaneous elevation of the towing vehicle relative to the instantaneous elevation of the towed vehicle. A related variation in attitude between the vehicles is the instantaneous ascent/descent orientation of the towing vehicle relative to the instantaneous ascent/descent orientation of the towed vehicle. Both of these related variations in attitude can be accommodated by apparatus designed to accommodate rotations between the towing and towed vehicles about a transverse, horizontal axis, sometimes referred to as the "pitch" axis, see the "z"-axis in FIG. 1.

Another such variation in attitude between the vehicles is the instantaneous horizontal direction in which the towing vehicle is traveling relative to the instantaneous horizontal direction in which the towed vehicle is traveling, such as when the towed vehicle is being pulled around an unbanked corner for example. This phenomenon, sometimes referred to as "yaw", can be accommodated by apparatus designed to accommodate rotations between the towing and towed vehicles about a vertical axis, see the "y"-axis in FIG. 1.

Finally, another such variation in attitude between the vehicles is the instantaneous sidewise tilt of the towing vehicle relative to the instantaneous sidewise tilt of the towed vehicle, such as the rocking motion which occurs when traversing uneven or rough pavement for example. This phenomenon, sometimes referred to as "roll", can be accommodated by tow bar apparatus designed to accommodate rotations between the towing and towed vehicles about a longitudinal, horizontal axis, see the "x"-axis in FIG. 1.

During actual towing operations, all combinations of pitch, yaw and roll phenomena are continuously occurring and changing. Prior art is replete with tow bar designs that have been developed in an attempt to accommodate these phenomena, some of those designs being more successful than others. For example, a ball hitch/ball hitch socket combination securing a tow bar to a towing vehicle can theoretically accommodate all three of the pitch, yaw and roll phenomena. Although the ability of such a combination to accommodate yaw is encouraging, unfortunately the ability of such a combination to accommodate either pitch or roll is extremely limited, where failure to closely abide by those limitations can produce disastrous and even fatal results.

A commonly used arrangement involves using a conventional receiver hitch in combination with a square tube. Although such an arrangement may be convenient for connecting a tow bar to a towing vehicle, this type of connection by itself provides absolutely no ability to accommodate any one of the three pitch, yaw or roll phenomena. As a result, the tow bar and/or the connections between the tow bar and the towed vehicle must be relied upon to provide a solution for minimizing the potentially detrimental effects of these phenomena.

Prior art tow bars have utilized a variety of structures to accommodate the three axes of rotation between the towing vehicle and the towed vehicle. Due to the extreme operational and environmental conditions to which the tow bars are subjected, some tow bars leave much to be desired.

For many applications, an ability to conveniently store a tow bar on a towing vehicle is a desirable feature, such as storing the legs of the tow bar legs in a generally vertical orientation. Unfortunately, such as arrangement generally interferes with access to the rear of the towing vehicle. Other arrangements include storing the legs of the tow bar in a generally horizontal orientation. Unfortunately, both storing arrangements—vertically and horizontally—generally require the use of pins which can be easily lost or difficult to remove, or require structure which may be complicated, inconvenient, unreliable or unsafe. See, for example, U.S. Pat. No. Re. 35,482 to Andrew B. Johnson for "Towing Hitch" wherein locking pin 84 in combination with cotter pin 86 are needed to retain that tow bar in a storage position. Also see U.S. Pat. No. 5,765,851 to Richard A. Parent for "Self-Aligning Towing Apparatus" wherein pin 70 and locking pin 232 are needed to retain that tow bar in a storage position.

What is needed is a tow bar wherein the structure thereof can accommodates the three axes of rotation between the towing vehicle and the towed vehicle, and can provide simple, uncomplicated stowing on the towing vehicle without the need for a pin or other potentially unsafe or unreliable mechanism for enabling storage on the towing vehicle.

SUMMARY OF THE INVENTION

The improvements of the present invention for tow bar apparatus for towing a towed vehicle behind a towing vehicle include a towing vehicle hitch apparatus mounted to the rear of a towing vehicle; a towed vehicle hitch apparatus mounted to the front of a vehicle to be towed; a towing connector releasably connectable to the towing vehicle hitch apparatus; a pair of opposing tow bar legs, each having a fore end with a pair of forwardly-extending flanges with a pair of vertically-aligned leg orifices and an aft end; a swivel unit; and rear leg connectors secured to the aft ends of the inner members releasably connect the tow bar legs to the towed vehicle hitch apparatus.

The swivel unit includes a first portion having a fore end fixedly secured to the towing connector, and an aft end having a rearwardly-extending yoke with a pair of horizontally-aligned first orifices; the first portion including at least one upwardly extending lobe structured to enable a user to pin-lessly stow the tow bar legs in a generally horizontal orientation at the rear of the towing vehicle.

The swivel unit also includes a second portion having a fore end with a horizontally-oriented second orifice, and an aft end having a cavity and an axially-oriented third orifice In communication with the cavity. A fastener through the first and second orifices pivotally connects the second portion to the first portion which operatively establishes a pitch axis between the towing and towed vehicles when the tow bar apparatus is in use.

The swivel unit further includes a third portion having a fore end with a forwardly-extending post rotatably captured in the cavity of the second portion which operatively establishes a roll axis between the towing and towed vehicles when the tow bar apparatus is in use; and an aft end with a vertically-oriented fourth orifice. A second fastener through the fourth and both pairs of leg orifices pivotally connects the tow bar legs to the third portion which operatively establishes a yaw axis between the towing and towed vehicles when the tow bar apparatus is in use.

The improvements include latching mechanisms structured to automatically releasably lock the tow bar legs in a deployed configuration; stowing latches structured to releasably secure the tow bar legs in the stowed configuration; and boots structured to enclose the inner members to the extent that they extend outwardly from their outer members.

A swivel device is provided for connecting a pair of tow bar legs to the towing hitch apparatus of a towing vehicle.

PRINCIPAL OBJECTS AND ADVANTAGES OF THE INVENTION

The principal objects and advantages of the present invention include: providing a tow bar which includes a compact unit for accommodating yaw, pitch and roll phenomena between towing and towed vehicles; providing such a tow bar which can provide simple, uncomplicated stowing on the towing vehicle without the need for a pin or other potentially unsafe or unreliable mechanism for enabling storage on a towing vehicle; and generally providing such a tow bar that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWING FIGURES

FIG. 1 is a side elevational view of a tow bar apparatus in use between a towing vehicle and a towed vehicle, in accordance with the present invention.

FIG. 2 is an schematic representation of a top plan view of the tow bar apparatus shown in FIG. 1.

FIG. 3 is an enlarged perspective view of a swivel unit of the tow bar apparatus.

FIG. 4 is an exploded perspective view of the swivel unit of the tow bar apparatus shown in FIG. 3.

FIG. 5 is a fragmentary, top plan view of legs of the tow bar.

DETAILED DESCRIPTION OF THE INVENTION

Figure 6:
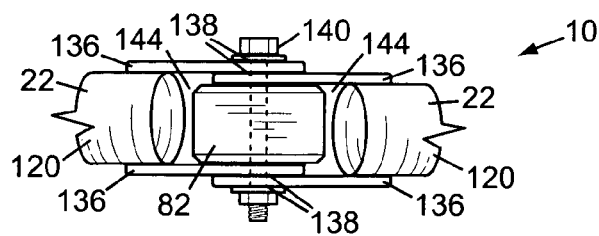
FIG. 6 is a fragmentary, schematic representation of a fastener pivotally connecting the legs of the tow bar apparatus to a third portion of a swivel unit thereof, showing gaps provided therebetween.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a apparatus having a compact swivel unit with pin-less stowing lobes in accordance with the present invention, as shown in FIGS. 1 through 10. The tow bar apparatus 10 includes a towing vehicle hitch apparatus 12 secured to the rear of a towing vehicle 14, a towing connector 16, a swivel unit 18, a pair of opposing tow bar legs 22, rear leg connectors 24, and a towed vehicle hitch apparatus 26 connected to a towed vehicle 28, and latching mechanisms 30.

The towing connector 16 is structured and configured to be releasably connectable to the towing vehicle hitch apparatus 12. For example, the towing vehicle hitch apparatus 12 may include a 2.5-inch conventional receiver hitch 12 with the towing connector 16 of tow bar 10 including a forwardly-extending shank 34 having a distal end 36, a proximal end 38, and a longitudinal axis 40. The distal end 36 is structured to be slidably, telescopingly and releasably receivable by the towing vehicle hitch apparatus 12, as indicated in FIG. 2.

A pin 42 through aligned orifices 44 through the towing vehicle hitch apparatus 12 and the shank 34 releasable secure the shank 34 to the towing vehicle hitch apparatus 12. It is to be understood that a towing connector 16 compatible with any other suitable size of receiver hitch or any other suitable type of hitch apparatus of the towing vehicle lies within the spirit and scope of the present invention.

A perspective view of the swivel unit 18 is shown in FIG. 3, and an exploded view thereof is shown in FIG. 4. The swivel unit 18 includes a first portion 50 with a fore end 52 fixedly secured to proximal end 38 of shank 34, and a yoke 54 having parallel spaced-apart arms 56 extending rearwardly from shank 34. Arms 56 include a pair of horizontally-aligned first orifices 58. The swivel unit 18 also includes a second portion 60 having an arcuate fore end 62 with a horizontally-oriented second orifice 64 alignable with aligned orifices 58, an aft end 66 with an axially-oriented third orifice 68 in communication with a cavity 70 having an end wall 72.

The swivel unit 18 further includes a third portion 74 having a fore end 76 with a cylindrically-shaped post 78 with axis 80 that extends forwardly through orifice 68 of aft end 66, and is captured in cavity 70, of second portion 60. Third portion 74 has an aft end 82 with a fourth orifice 84 oriented perpendicularly to axis 80 of post 78.

For assembly purposes, second portion 60 may be fabricated as two opposing sections 86, 88 as shown in FIG. 4. Each section 86, 88 includes half of groove 90 to thereby form a circularly-shaped groove 90 when the sections 86, 88 are assembled to form the second portion 60 as a unit with cavity 70 therein. Post 78 includes an annular rib 92 thereabout which, after assembly of swivel unit 18 as a unit, is rotatably captured in groove 90.

If desired, sections 86, 88 may include an alignment mechanism 94, such as a tongue and groove-like feature as shown in FIG. 4 for example, to ensure proper alignment of sections 86, 88 during assembly of second portion 60 as a unit. Also, swivel unit 18 may include one or more spacers, such as spacer 96 positioned between the fore end 76 of third portion 74 and aft end 66 of second portion 60 for example, and spacer 98 positioned between annular rib 92 and end wall 72 of cavity 70 of second portion 60 for example. Preferably, the spacers are constructed of a composite material or other suitable material to provide lubrication between the second and third portions 60, 74.

A fastener 104, such as a bolt, washers and nut for example, through orifices 58, 64 rotatably secures second portion 60 to first portion 50 to pivot about axis 106, which operatively establishes a pitch axis 106 between the towing and towed vehicles when tow bar apparatus 10 is in use. Accordingly, post 78, rotatably captured in cavity 70 of second portion 60, operatively establishes axis 80 as a roll axis between the towing and towed vehicles when tow bar apparatus 10 is in use.

Each of the legs 22 includes a tubular outer member 120 with a fore end 122 and an aft end 124. Each of the legs 22 also includes an inner member 126 having a fore end 128 and an aft end 130 as shown in FIG. 5. The fore end 128 of each inner member 126 is telescopingly and longitudinally displaceable within the aft end 124 of its respective outer member 120. The outer member 120 of each leg 22 is fixedly secured to a pair of parallel, spaced-apart flanges 136 wherein each pair of flanges 136 includes a pair of vertically-aligned leg orifices 138 as indicated in FIG. 6.

A fastener 140, such as a bolt, washers and nut for example, inserted through orifice 84 and both pairs of leg orifices 138, as shown in FIGS. 4 and 6, pivotally secures legs 22 to the third portion 74 of the swivel unit 18, which operatively establishes a yaw axis 142 between the towing and towed vehicles when tow bar apparatus 10 is in use. The pair of aligned orifices 138 of each tow bar leg 22 are spaced from the respective outer member 120 such that a gap 144 is provided between the outer member 120 and the aft end 82 of the third portion 74 of swivel unit 18.

One of the latching mechanisms 30 is secured near the aft end 124 of each outer member 120 to enable releasably locking of each inner member 126 in a deployed configuration 146 relative to its respective outer member 120 as disclosed and taught in U.S. Pat. No. 7,959,180 for example, which disclosure and teachings are incorporated herein by reference. If desired, a flexible boot 148 constructed of rubber or other suitable material may be used to enclose a portion of each inner member 126, which extends rearwardly from aft end 124 of its respective outer member 120, to thereby protect that otherwise exposed portion of the inner member 126 from debris and contamination, as indicated in FIG. 5.

A rear leg connector 24 is connected to the distal end 130 of each inner member 126 to enable pivotal connection of the inner member 126 to the towed vehicle hitch apparatus 26 of a towed vehicle.

Figure 7:
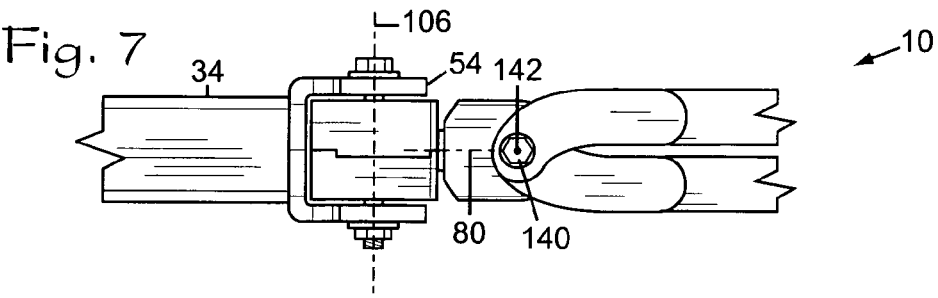
FIG. 7 is a schematic representation of orientations of the three axes of the tow bar apparatus prior to placement thereof in a stowed configuration as viewed from above.

The present invention further includes a pin-less stowing mechanism 160 which enables positioning of tow bar apparatus 10 in a stowed configuration 162 alongside the rear of the towing vehicle. The stowing mechanism 160 includes one or each of the arms 56 of the yoke 54 of first portion 50 of swivel unit 18 having an upwardly-extending lobe 164 as shown in FIG. 4. A schematic representation of axes 80, 106, 142 (roll axis 80, pitch axis 106 and yaw axis 142) of the swivel unit 18 as viewed from above is shown in FIG. 7.

To place tow bar apparatus 10 in the stowed configuration 162 after the rear leg connectors 24 have been disconnected from the towed vehicle hitch apparatus, aft ends 130 of the inner members 126 and the second and third portions 60, 74 of the swivel unit 18 are pivoted about fastener 104 and axis 106 to a vertical orientation. Legs 22 in a side-by-side arrangement are then pivoted about axis 142 to a lateral, generally horizontal orientation as indicated by the arrow designated by numeral 166 in FIG. 8, such that the lobe 164, toward which legs 22 are being pivoted, is inserted into gap 144 between the outer member 120 of the lowermost leg 22 and third portion 74 of swivel unit 18 to thereby stabilize legs 22 in the stowed configuration 162.

It should be noted that lobes 164 of the swivel unit 18 provide a convenient, simple, safe and reliable pin-less mechanism for stowing tow bar apparatus 10 horizontally on the rear of a towing vehicle when not in use, which not only eliminates the need for a pin but also eliminates the need for some kind of storing notch or other mechanism, which may be prone to inconvenient snagging and/or to accumulation of unwanted debris, or which sometimes require tow bar legs to be stored in an inconvenient upright orientation which may not reliably retain tow bar legs in such an upright configuration.

It is to be understood that the towing connector 16 and swivel unit 18 may be combined as a swivel device 167 for connecting a pair of opposing tow bar legs to a towing vehicle hitch apparatus of a towing vehicle as described herein.

Figure 9:
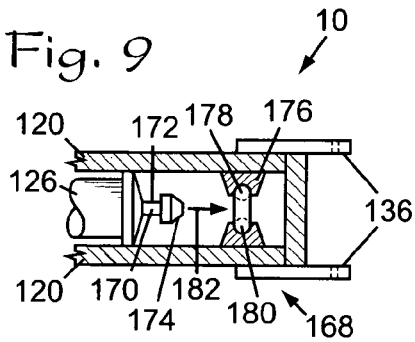
FIG. 9 is an enlarged, fragmentary and partially cross-sectional side elevational view showing an inner member of a leg about to be latched by a stowing latch of the tow bar apparatus.
Figure 10:
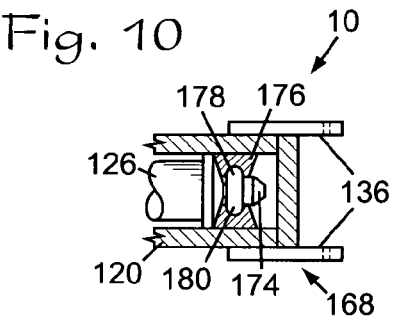
FIG. 10 is a view similar to FIG. 9 but showing the inner member latched by the stowing latch, according to the present invention.

To preferably minimize the extent which legs 22 extend laterally in the stowed configuration 162, each of the legs 22 may include a stowing latch 168. Stowing latch 168 includes a centered cylindrically-shaped plunger 170 extending forwardly from fore end 128 of each inner member 126. The plunger 170 includes a shaft 172, a tapered end 174, and an annular ridge 176 about tapered end 174 of plunger 170, as shown in FIGS. 9 and 10.

Each stowing latch 168 also includes a retainer 178 secured to the outer member 120 of the respective leg 22 near the fore end 122 thereof. For example, the retainer 178 may include a resilient O-ring 180. The O-ring 180 extends into the path of annular ridge 176 as the inner member 126 is displaced longitudinally inwardly relative to its outer member 120, as indicated by the arrow designated by numeral 182.

Figure 8:
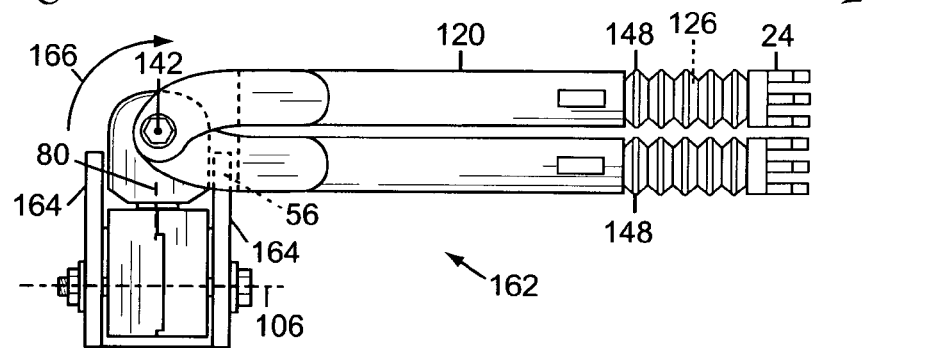
FIG. 8 is a schematic representation of the tow bar apparatus in a stowed configuration as viewed from the rear with a lobe of the swivel unit spaced in a gap and inner members of legs thereof secured by stowing latches.

The basic function of each stowing latch 168 can be described as follows. As the inner member 126 is being displaced longitudinally inwardly relative to its respective outer member 120 wherein the plunger 170 is forced against the O-ring 180, O-ring 180 responsively expands allowing the annular ridge 176 to pass through the O-ring 180 whereupon the O-ring 180 immediately and resiliently shrinks to grasp shaft 172 of plunger 170, thereby trapping O-ring 180 between annular ridge 176 and fore end 128 of the inner member 126, thereby retaining inner member 126 in the stowed configuration 162, as schematically shown in FIG. 8. Subsequently, a user can release the respective leg 22 from the stowed configuration 162 by pulling longitudinally outwardly on aft end 130 of the inner member 126, thereby causing annular ridge 176 to pass back through O-ring 180 and freeing inner member 126 from the stowed configuration 162.

The rear leg connectors 24 are secured to the respective aft ends 130 of inner members 126 of the tow bar legs 22. The rear leg connectors 24 are structured to releasably connect the tow bar legs 22 to the towed vehicle hitch apparatus 26.

In an application of the present invention, the rear end of the towing vehicle is temporarily positioned forwardly from the front end of the towed vehicle. The fore-and-aft orientations of the towing and towed vehicles need not be perfectly aligned, nor does the spacing between the vehicles need to be exact. If the tow bar legs 22 are in the stowed configuration 162, the aft ends 130 of the inner members 126 are manually pulled longitudinally outwardly to free the inner members 126 from the stowed configuration 162 so the inner members 126 can be easily and individually displaced longitudinally outwardly relative to their respective outer members 120. Each tow bar leg 22 is then separately extended or retracted as necessary to adjust its length to accommodate the temporary spacing between the towing and towed vehicles.

After both tow bar legs 22 have been connected to the towed vehicle hitch apparatus 26, the towing vehicle is slowly eased forwardly relative to the towed vehicle thereby causing the latching mechanisms 30 to automatically lock the inner members of the legs 22 relative to their respective outer members 120 when the spacing between the towing and towed vehicles reaches the predetermined spacing of the deployed configuration 146. The towed vehicle is then properly aligned with, and spaced at a desired predetermined towing distance from, the towing vehicle. After attaching safety chains and making necessary electrical and braking connections, etc., the towed vehicle is ready to be towed by the towing vehicle.

Later, when the tow bar apparatus 10 has been disconnected from the towed vehicle and is no longer being used, and with the tow bar legs 22 unlocked from the deployed configuration 146, the inner members 126 can be separately, longitudinally and telescopingly displaced in their respective outer members 120 and positioned relative to one of the lobes 164 in the stowed configuration 162 as hereinbefore described.

It is to be understood that while certain forms of the present invention have been illustrated and described herein, it is not to be limited to the specific forms or arrangement of parts as described and shown.

What is claimed is as follows:

1. A tow bar apparatus for towing a towed vehicle behind a towing vehicle, the tow bar apparatus comprising:
    (a) a towing vehicle hitch apparatus mounted to a rear of the towing vehicle;
    (b) a towed vehicle hitch apparatus mounted to a front of the towed vehicle;
    (c) a towing connector structured to be releasably connectable to the towing vehicle hitch apparatus;
    (d) a pair of opposing tow bar legs, each tow bar leg including:
        (1) a pair of parallel flanges with a pair of vertically-aligned leg orifices,
        (2) an outer member fixedly secured to and extending-rearwardly from the pair of flanges and spaced from the leg orifices to provide a gap, and
        (3) an inner member slidably, telescopingly and longitudinally receivable by the outer member;
    (e) a swivel unit including:
        (1) a first portion having a fore end fixedly secured to the towing connector, and an aft end having a rearwardly-extending yoke with a pair of horizontally-aligned first orifices; the first portion including at least one upwardly-extending lobe structured to be receivable by one of the gaps of the tow bar legs to thereby enable a user to pin-lessly stow the tow bar legs in a generally horizontally-oriented stowed configuration at the rear of the towing vehicle,
        (2) a second portion having a fore end with a horizontally-oriented second orifice, and an aft end having a cavity and an axially-oriented third orifice in communication with the cavity,
        (3) a first fastener through the first and second orifices which pivotally connects the second portion to the first portion and which operatively establishes a pitch axis between the towing and towed vehicles when the tow bar apparatus is in use,
        (4) a third portion having a fore end with a forwardly-extending post rotatably captured in the cavity of the second portion which operatively establishes a roll axis between the towing and towed vehicles when the tow bar apparatus is in use, and an aft end with a vertically-oriented fourth orifice, and
        (5) a second fastener, through the fourth orifice and both pairs of leg orifices of the tow bar legs, which pivotally connect the tow bar legs to the third portion and which operatively establishes a yaw axis between the towing and towed vehicles when the tow bar apparatus is in use;
    (f) latching mechanisms secured to the outer members and structured to automatically releasably lock the tow bar legs in a deployed configuration;
    (g) stowing latches secured to the outer members and structured to releasably secure the tow bar legs in the stowed configuration;
    (h) boots structured to enclose the inner members such that the boots extend outwardly from the respective outer members; and
    (i) rear leg connectors secured to aft ends of the inner members and structured to releasably connect the pair of tow bar legs to the towed vehicle hitch apparatus.

2. A tow bar apparatus for towing a towed vehicle behind a towing vehicle, the tow bar apparatus comprising:
    (a) a towing vehicle hitch apparatus mounted to a rear of the towing vehicle;
    (b) a towed vehicle hitch apparatus mounted to a front of the towed vehicle;
    (c) a towing connector structured to be releasably connectable to the towing vehicle hitch apparatus;
    (d) a swivel unit including:
        (1) a first portion fixedly secured to the towing connector and having a rearwardly-extending yoke with a pair of horizontally-aligned first orifices,
        (2) a second portion connected to the first portion to pivot about a transverse horizontal axis and having a fore end with a horizontally-oriented second orifice,
        (3) a third portion connected to the second portion to pivot about a fore-to-aft generally horizontal axis, and
        (4) a fastener through the pair of first orifices and the second orifice which pivotally connects the second portion to the first portion and which operatively establishes the transverse horizontal axis between the towing and towed vehicles when the tow bar apparatus is in use;
    (e) a pair of opposing tow bar legs, each tow bar leg having a fore end connected to the third portion to pivot about a generally vertical axis, and an aft end; and (f) rear leg connectors structured to releasably connect the aft ends of the tow bar legs to the towed vehicle hitch apparatus;

(g) wherein the first portion includes at least one upwardly extending lobe structured to enable a user to pin-lessly stow the tow bar legs in a generally horizontally-oriented stowed configuration at the rear of the towing vehicle.

3. A tow bar apparatus as described in claim 2, further comprising each tow bar leg including: an outer member, a parallel pair of flanges fixedly secured to and extending forwardly from the outer member, wherein the pair of flanges are connected to an aft end of the third portion to pivot about the generally vertical axis, and an inner member structured to be slidably, telescopingly and longitudinally displaceable in the outer member, wherein the outer member of each tow bar leg is spaced from the aft end of the third portion to form a gap therebetween, the gap being structured to receive the at least one lobe as the tow bar apparatus assumes the stowed configuration.

4. A tow bar apparatus as described in claim 2, further comprising each tow bar leg including: an outer member, a parallel pair of flanges fixedly secured to and extending forwardly from the outer member, wherein the pair of flanges are connected to an aft end of the third portion to pivot about the generally vertical axis, an inner member structured to be slidably, telescopingly and longitudinally displaceable in the outer member, and a latching mechanism structured to automatically and releasably latch the inner member relative to the outer member in a deployed configuration.

5. A tow bar apparatus as described in claim 2, further comprising each tow bar leg including: an outer member, a parallel pair of flanges fixedly secured to and extending forwardly from the outer member, wherein the pair of flanges are connected to an aft end of the third portion to pivot about the generally vertical axis, an inner member structured to be slidably, telescopingly and longitudinally displaceable in the outer member, and a stowing latch structured to retain the inner member in a stowed configuration as the inner member is being displaced forwardly relative to the outer member.

6. A tow bar apparatus as described in claim 2, further comprising each tow bar leg including: an outer member, a parallel pair of flanges fixedly secured to and extending forwardly from the outer member, wherein the pair of flanges are connected to an aft end of the third portion to pivot about the generally vertical axis, an inner member structured to be slidably, telescopingly and longitudinally displaceable in the outer member, and a flexible boot structured to enclose each inner member such that the flexible boot extends outwardly from the outer member.

7. A tow bar apparatus for owing a towed vehicle behind a towing vehicle, the tow bar apparatus comprising:

(a) a towing vehicle hitch apparatus mounted to a rear of the towing vehicle;

(b) a towed vehicle hitch apparatus mounted to a front of the towed vehicle;

(c) a towing connector structured to be releasably connectable to the towing vehicle hitch apparatus;

(d) a swivel unit including:

(1) a first portion fixedly secured to the towing connector, (2) a second portion connected to the first portion to pivot about a transverse horizontal axis and having a cavity and an aft end with an axially-oriented orifice in communication with the cavity, (3) a third portion connected to the second portion to pivot about a fore-to-aft generally horizontal axis and having a fore end with a forwardly-extending post rotatably captured in the cavity of the second portion which connects the third portion to the second portion and which operatively establishes the fore-to-aft generally horizontal axis between the towing and towed vehicles when the tow bar apparatus is in use;

(e) a pair of opposing tow bar legs, each tow bar leg having a fore end connected to the third portion to pivot about a generally vertical axis, and an aft end; and (f) rear leg connectors structured to releasably connect the aft ends of the tow bar legs to the towed vehicle hitch apparatus;

(g) wherein the first portion includes at least one upwardly extending lobe structured to enable a user to pin-lessly stow the tow bar legs in a generally horizontally-oriented stowed configuration at the rear of the towing vehicle.

8. A tow bar apparatus as described in claim 7, further comprising each tow bar leg including: an outer member, a parallel pair of flanges fixedly secured to and extending forwardly from the outer member, wherein the pair of flanges are connected to an aft end of the third portion to pivot about the generally vertical axis, and an inner member structured to be slidably, telescopingly and longitudinally displaceable in the outer member, wherein the outer member of each tow bar leg is spaced from the aft end of the third portion to form a gap therebetween, the gap being structured to receive the at least one lobe as the tow bar apparatus assumes the stowed configuration.

9. A tow bar apparatus as described in claim 7, further comprising each tow bar leg including: an outer member, a parallel pair of flanges fixedly secured to and extending forwardly from the outer member, wherein the pair of flanges are connected to an aft end of the third portion to pivot about the generally vertical axis, an inner member structured to be slidably, telescopingly and longitudinally displaceable in the outer member, and a latching mechanism structured to automatically and releasably latch the inner member relative to the outer member in a deployed configuration.

10. A tow bar apparatus as described in claim 7, further comprising each tow bar leg including: an outer member, a parallel pair of flanges fixedly secured to and extending forwardly from the outer member, wherein the pair of flanges are connected to an aft end of the third portion to pivot about the generally vertical axis, an inner member structured to be slidably, telescopingly and longitudinally displaceable in the outer member, and a stowing latch structured to retain the inner member in a stowed configuration as the inner member is being displaced forwardly relative to the outer member.

11. A tow bar apparatus as described in claim 7, further comprising each tow bar leg including: an outer member, a parallel pair of flanges fixedly secured to and extending forwardly from the outer member, wherein the pair of flanges are connected to an aft end of the third portion to pivot about the generally vertical axis, an inner member structured to be slidably, telescopingly and longitudinally displaceable in the outer member, and a flexible boot structured to enclose each inner member such that the flexible boot extends outwardly from the outer member.

12. A tow bar apparatus for towing a towed vehicle behind a towing vehicle, the tow bar apparatus comprising:

(a) a towing vehicle hitch apparatus mounted to a rear of the towing vehicle;

(b) a towed vehicle hitch apparatus mounted to a front of the towed vehicle;

(c) a towing connector structured to be releasably connectable to the towing vehicle hitch apparatus;

(d) a swivel unit including:
  (1) a first portion fixedly secured to the towing connector,
  (2) a second portion connected to the first portion to pivot about a transverse horizontal axis,
  (3) a third portion connected to the second portion to pivot about a fore-to-aft generally horizontal axis and having an aft end with a vertically-oriented orifice;
(e) a pair of opposing tow bar legs, each tow bar leg having a fore end connected to the third portion to pivot about a generally vertical axis, wherein the fore end has a pair of vertically-aligned leg orifices, and an aft end, each tow bar leg including:
  (1) an outer member, a parallel pair of flanges fixedly secured to and extending forwardly from the outer member, wherein the pair of flanges include one of the pairs of vertically-aligned leg orifices, and
  (2) an inner member structured to be slidably, telescopingly and longitudinally displaceable in the outer member;
(f) a fastener through the vertically-oriented orifice and the pairs of leg orifices which pivotally connects the tow bar legs to the third portion and which operatively establishes the generally vertical axis between the towing and towed vehicles when the tow bar apparatus is in use; and
(g) rear leg connectors structured to releasably connect the aft ends of the tow bar legs to the towed vehicle hitch apparatus;
(h) wherein the first portion includes at least one upwardly extending lobe structured to enable a user to pin-lessly stow the tow bar legs in a generally horizontally-oriented stowed configuration at the rear of the towing vehicle.

13. A tow bar apparatus as described in claim 12, wherein the outer member of each tow bar leg is spaced from the aft end of the third portion to form a gap therebetween, the gap being structured to receive the at least one lobe as the tow bar apparatus assumes the stowed configuration.

14. A tow bar apparatus as described in claim 12, further comprising each tow bar leg including a latching mechanism structured to automatically and releasably latch the inner member relative to the outer member in a deployed configuration.

15. A tow bar apparatus as described in claim 12, further comprising each tow bar leg including a stowing latch structured to retain the inner member thereof in a stowed configuration as the inner member is being displaced forwardly relative to the outer member.

16. A tow bar apparatus as described in claim 12, further comprising a flexible boot structured to enclose each inner member such that the flexible boot extends outwardly from the outer member.

* * * * *